United States Patent
Toillon et al.

(10) Patent No.: US 7,309,169 B2
(45) Date of Patent: Dec. 18, 2007

(54) SINGLE-CHANNEL COMMUNICATION DEVICE FOR OPTICAL FIBRE

(75) Inventors: Patrice Toillon, Fourqueux (FR); Mathias Pez, Paris (FR); François Quentel, Paris (FR)

(73) Assignees: Thales, Neuilly Sur Seine (FR); D-Lightsys, Orsay (FR)

( * ) Notice: Subject to any disclaimer, the term of this patent is extended or adjusted under 35 U.S.C. 154(b) by 0 days.

(21) Appl. No.: 10/569,544

(22) PCT Filed: Aug. 26, 2004

(86) PCT No.: PCT/EP2004/051910

§ 371 (c)(1), (2), (4) Date: Feb. 27, 2006

(87) PCT Pub. No.: WO2005/022785

PCT Pub. Date: Mar. 10, 2005

(65) Prior Publication Data

US 2006/0245697 A1    Nov. 2, 2006

(30) Foreign Application Priority Data

Aug. 29, 2003    (FR)    ................................... 03 10312

(51) Int. Cl.
*G02B 6/36*    (2006.01)
*H04B 10/00*    (2006.01)

(52) U.S. Cl. .............................. 385/88; 385/92; 385/93; 385/37; 385/31; 385/33; 385/38; 398/135; 398/138; 398/139

(58) Field of Classification Search ................. 385/14, 385/49, 88, 89, 93, 92, 94, 38, 31, 33, 37; 398/138, 139, 135
See application file for complete search history.

(56) References Cited

U.S. PATENT DOCUMENTS 4,381,882 A * 5/1983 Sabine ......................... 385/77
5,914,976 A * 6/1999 Jayaraman et al. ....... 372/50.21

(Continued)

FOREIGN PATENT DOCUMENTS

FR    2 556 480    6/1985    ............... 385/38 X

OTHER PUBLICATIONS

Abstract of FR 2556480 Jun. 14, 1985.

*Primary Examiner*—Brian M. Healy
(74) *Attorney, Agent, or Firm*—Lowe Hauptman Ham Berner, LLP

(57) ABSTRACT

The field of the invention is that of fiber-optic communication devices known as transceivers, used in the aeronautical field for ensuring that on-board electronic computers can converse with one another, or in civil telecommunication.

The subject of the invention is a single-channel transceiver comprising essentially a transmitting optoelectronic part, a receiving optoelectronic part, and a specific optical configuration for transmitting and receiving optical signals on a single optical port in real time and using the same wavelength. The optical architectures according to the invention include no semireflecting components, thus making it possible to reduce light energy losses at transmission and reception of the optical signals.

These transceivers are particularly well suited for the construction of single-fiber full-duplex optical communication networks allowing simultaneous transmission and reception of signals.

16 Claims, 7 Drawing Sheets

U.S. PATENT DOCUMENTS

| | | | |
|---|---|---|---|
| 5,963,349 A | 10/1999 | Norte | 359/116 |
| 6,243,508 B1 * | 6/2001 | Jewell et al. | 385/14 |
| 6,351,584 B1 | 2/2002 | Horie et al. | 385/31 |
| 6,741,777 B2 * | 5/2004 | Jewell et al. | 385/49 |
| 2003/0063346 A1 | 4/2003 | Pez | 359/118 |
| 2006/0245697 A1 * | 11/2006 | Toillon et al. | 385/88 |

* cited by examiner

SINGLE-CHANNEL COMMUNICATION DEVICE FOR OPTICAL FIBRE

The field of the invention is that of fiber-optic communication devices known as transceivers and of the associated communication systems.

These communication devices are used especially in the aeronautical field for enabling on-board electronic computers to converse with one another. These devices are also used in civil telecommunications.

Recent communication systems are making increasing use of central components for connecting several electronic computers together, the computers also being called subscriber computers. The general topology of these networks is of the star or multi-star type. Each star center is occupied by a central component which may either be a passive optical coupler or what is called a "hub", which fulfills the repeater function with monitoring of the transmitted data, or else what is called a "switch", which fulfills both the function of repeater and of switching between the various subscribers. The latter two components are used in particular in the case of networks called "switched Ethernets".

Conventionally, inter-component links of this communication system type are provided by two-way electrical links, the first link being dedicated to signal transmission and the second to signal reception. This full-duplex system allows simultaneous transmission and reception of signals on the same computer. Each electrical link is generally performed by a single electrical cable comprising two pairs of shielded twisted wires, the cable being a double twisted pair cable or a star quad cable. Each cable is connected to the subscriber electronic computer by four-contact electrical connectors are also called quadrax connectors. These connectors are used for example on on-board aeronautical Ethernet networks of the ARINC 664 type.

However, electrical links between computers have a number of drawbacks. Mention may be made in particular of a bandwidth limited to 100 Mbits/s and, for applications on board aircraft, a not insignificant weight.

Figure 1:
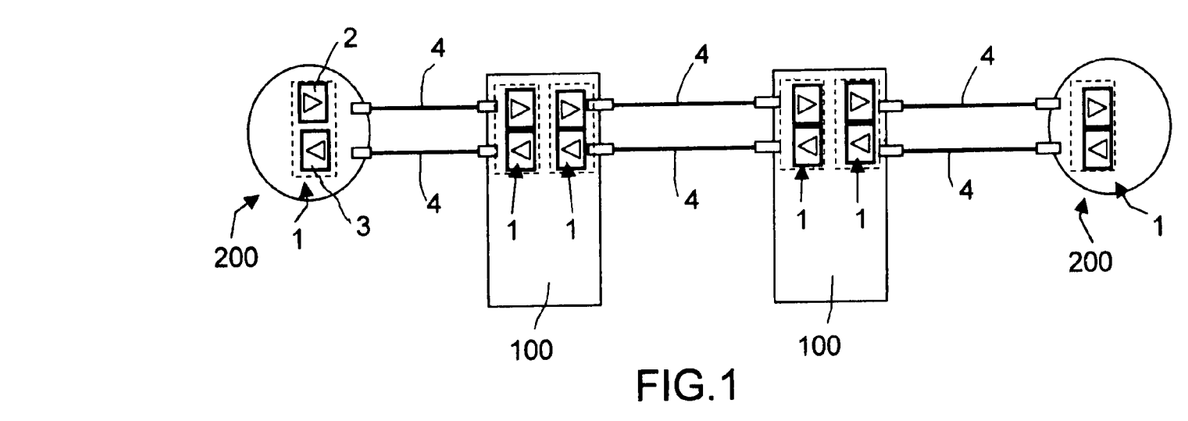
FIG. 1 shows a partial diagram of a two-channel full-duplex architecture according to the prior art.

One possible solution for reducing these problems consists in replacing the electrical links with fiber-optic links. FIG. 1 illustrates an architecture of this type. This figure shows the links between two subscriber computers 200 shown symbolically by circles. These two subscribers are connected together via two central units 100. The subscriber/central unit and central unit/central unit links are provided by pairs of optical fibers 4. Each pair is connected at these two ends to a transceiver-type communication device 1 comprising a transmitting part 2 and a receiving part 3, the function of the transceiver being to convert the electronic signals transmitted and received by the computer or the central unit into optical signals that can propagate along the linking optical fiber.

Figure 2:
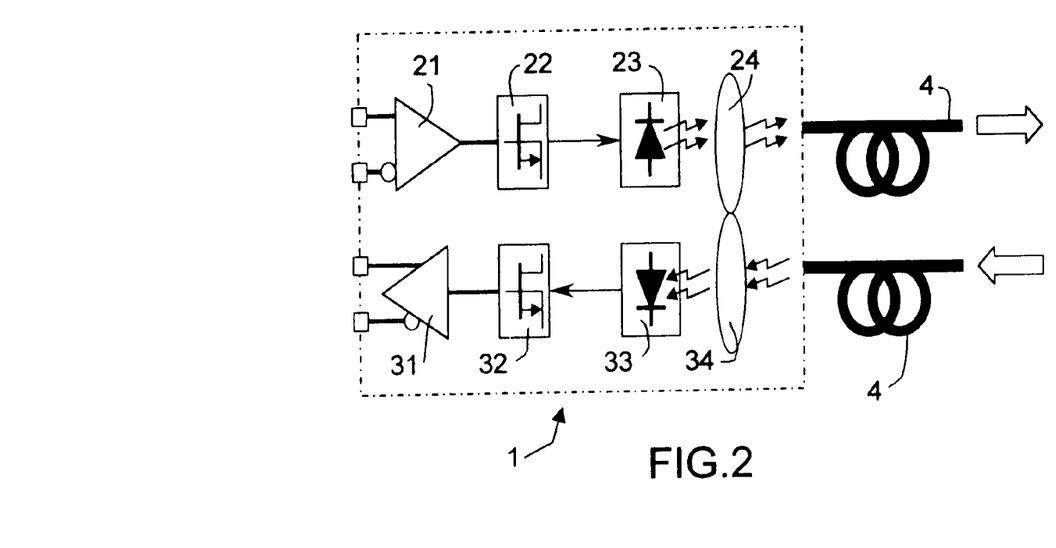
FIG. 2 shows an electronic diagram of a two-channel fiber-optic transceiver.

FIG. 2 shows in detail the architecture of each transceiver 1. The transmitting part 2 comprises a digital electronic input interface 21 compatible with the electrical levels of the electronic receive card, an analog electronic device 22 converting the digital signals into analog signals, and an emitting optical source 23 which emits a light beam 25 modulated by the signal output by the electronic device 22 (shown symbolically by two zig-zagged arrows in FIG. 2). The optic 24 optically couples said beam to the optical fiber 4. The receiving part includes a second optic 35, which couples the beam received by the optical fiber 4 onto a photodetector 33. The electrical signal output by the photodetector then passes through an analog electronic device 32 and finally through a digital electronic device 31, which delivers a digital signal of the same type as that of the digital transmission signal.

This solution using two optical fibers, although having certain advantages over electrical links, especially in terms of bandwidth, does however have several major drawbacks, essentially in terms of costs, in terms of size (a central unit may serve up to twenty-four subscribers and consequently requires an interface comprising as many transceivers), in terms of cable installation and associated maintenance management, and also in terms of reliability of the complete system.

To alleviate these drawbacks, one possible solution consists in replacing the two-fiber link with a solution based on a single optical fiber.

Figure 3:
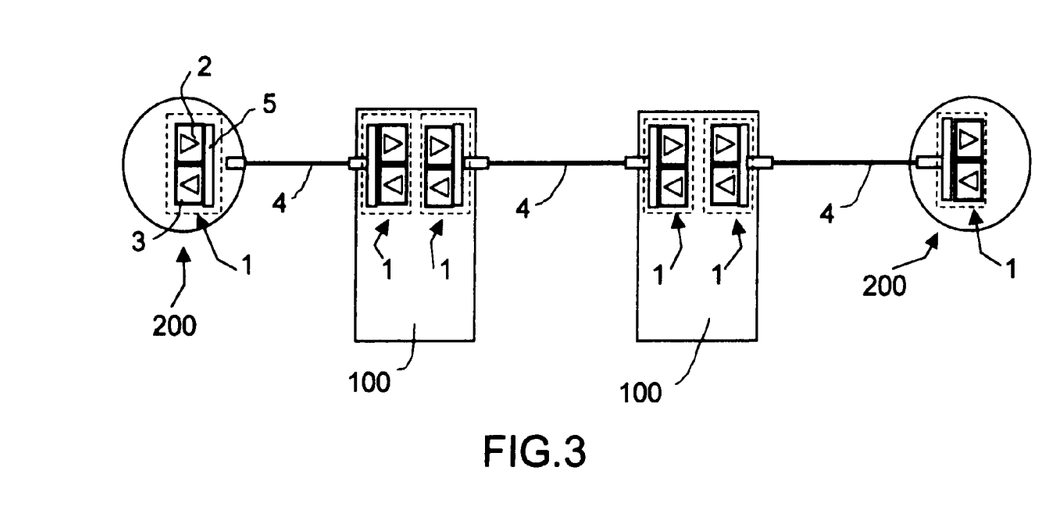
FIG. 3 shows a partial view of a single-channel full-duplex architecture.

FIG. 3 illustrates an architecture of this type. This figure shows the links between two subscriber computers 200 shown symbolically by circles. These two subscribers are connected together via two central units 100. The subscriber/central unit and central unit/central unit links are provided by an optical fiber 4. Each optical fiber is connected at these two ends to a transceiver-type communication device 1 comprising a transmitting part 2, a receiving part 3 and an optical device for separating the emit and receive beams propagating in the optical fiber.

Of course, this solution reduces the costs, the size and the weight by a factor of 2. In this case, the transceiver has only a single optical output, which ensures both light emission and reception. Of course, the input and output beams inside the transceiver must be separated, the first being intended for the photoreceiver and the second coming from the emitter.

Figure 4:
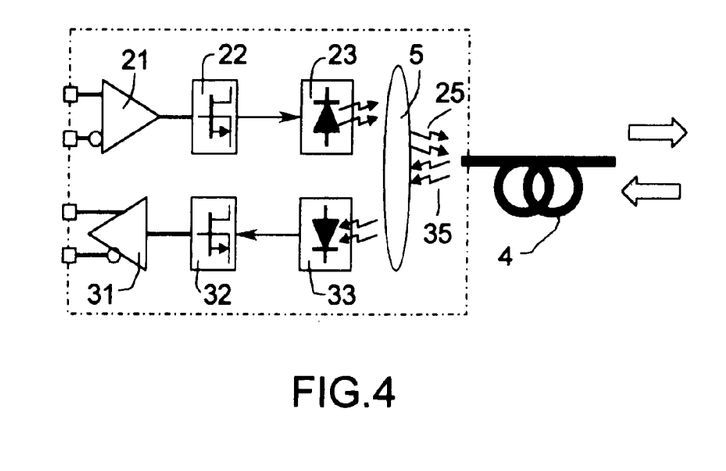
FIG. 4 shows an electronic diagram of a single-channel fiber-optic transceiver.

FIG. 4 shows in detail the architecture of each transceiver 1. The transmitting part 2 includes a digital electronic input interface 21 compatible with electronic card transfer technology, an analog electronic device 22 that converts the digital signals into analog signals, and an emitting optical source 23 that emits a light beam 25 modulated by the signal output by the electronic device 22 (shown symbolically by two zig-zagged arrows in FIG. 2). The common optic 5 couples said beam onto the entry of an optical fiber 4. The receiving part includes said common optic 5 which couples the beam coming from the optical fiber 4 onto a photodetector 33. The electrical signal generated by the photodetector then passes through an analog electronic device 32 and finally through a digital electronic device 31 that delivers a digital signal compatible with the receive card voltage levels. The transmitted powers are of the order of a few dBm, the dBm being the power unit used in optical telecommunications. It is defined as follows:

$$1\ \text{dBm} = 10\ \log(P_{opt}/1\ \text{mW})$$

where $P_{opt}$ is the optical power in milliwatts.

The power levels received by the photodetector are of the order of 0 dBm to −20 dBm for an aeronautic-type network.

Several technical solutions are known for producing the common optic 5 that ensures separation of the light beams.

The first solution consists in using a semireflecting plate provided with a dichroic treatment, which ensures beam separation. However, a large portion of the light emitted and received is lost. At best, 25% of the light emitted is received at the other end of the link. Now, optical link losses between two components of the network may amount to 18 dB to 20 dB in aeronautics, most of these losses being due to the optical connections. This is because an optical link may comprise up to seven connection points. The additional loss introduced by the semireflecting component is therefore highly prejudicial to proper operation of the network. Moreover, in this optical arrangement, the photoreceiver receives part of the signal transmitted by the transmitter, which corrupts the received signal.

It is also possible to replace the semireflecting plate with an optical coupler. The problems of parasitic light are thus reduced. However, couplers are expensive, bulky and fragile components.

Finally, to preserve correct power balance, it is possible to transmit and receive within different wavelength bands by wavelength multiplexing. However, the cost of this type of solution remains high and this solution is difficult to make compatible with on-board applications. Moreover, this solution is necessarily more complex to implement insofar as it requires various types of transmitters and receivers.

It is an object of the invention to propose a transceiver of the single-fiber type that does not have the above drawbacks. The transceiver must provide an optical function for separating the emitted and received light beams. The core of the invention is the geometrical separation of the beams without the use of splitting components of the semireflecting-plate type, which introduce excessively large light energy losses. The arrangements proposed allow transceivers to be produced with integrated components and for a low cost.

More precisely, one subject of the invention is an optical communication device for optical fibers, of the transceiver type comprising at least electronic emission and receiver means, a light emission source, a photoreceiver and optical means or an optical configuration making it possible, on the one hand, to couple what is called an emit light beam output by the emission source into an optical fiber and, on the other hand, to couple what is called the receive light beam, coming from said optical fiber onto the photoreceiver, the emit beam incident on the entry face of the said fiber being bounded by a solid angle $\alpha$ and the receive beam incident on said entry face being bounded by a solid angle $\beta$, which device is distinguished by the fact that the solid angle $\alpha$ is essentially separate from the solid angle $\beta$, allowing geometrical separation of the emit and receive beams.

Another subject of the invention is an optical communication device for optical fibers, of the transceiver type comprising at least electronic emission and receiver means, a light emission source, a photoreceiver and optical means or an optical configuration making it possible, on the one hand, to send what is called an emit light beam output by the emission source onto the entry face of an optical fiber and, on the other hand, to couple what is called the receive light beam, coming from said optical fiber onto the photoreceiver, the emit beam incident on said entry face of the fiber being bounded by an emission area and the receive beam incident on said entry face being bounded by a receiver area, which device is distinguished by the fact that the emission area is of substantially smaller size than the receiver area, allowing geometrical separation of the emit and receive beams.

The optical means therefore have no semireflecting plates or equivalent devices for separating the emit and receive beams. This makes it possible to achieve good coupling efficiency for both the emit and receive beams.

The invention will be more clearly understood and other advantages will become apparent on reading the description that follows, given by way of nonlimiting illustration, and on examining the appended figures in which.

Figure 5:
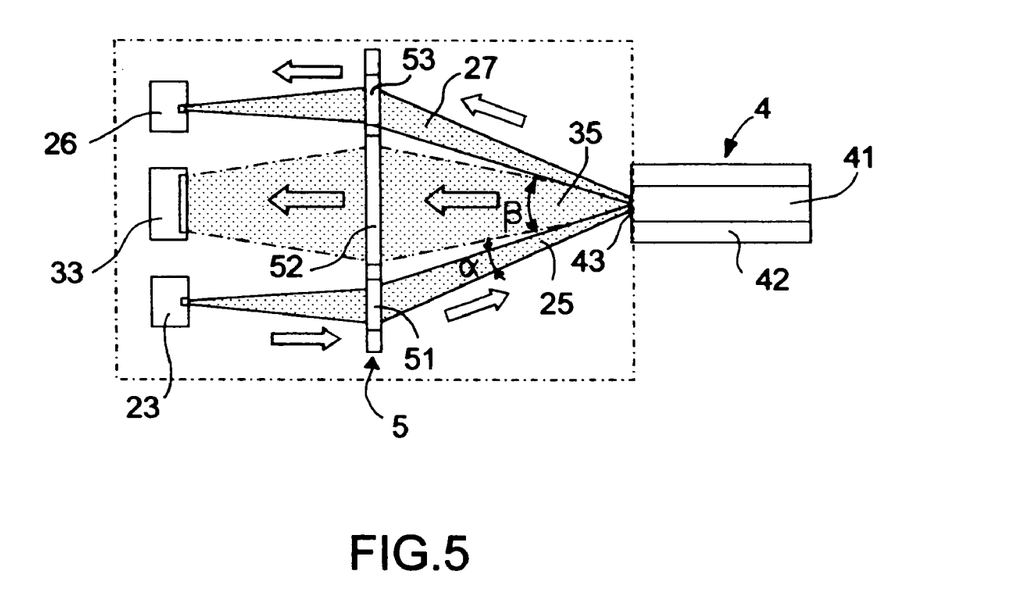
FIG. 5 shows the optical part of a transceiver according to the invention in a first embodiment.

FIG. 5 shows the optical part of a transceiver according to the invention in a first embodiment. This optical part essentially comprises an emission source 23, a photodetector 33 and, placed between the emitter/photodetector assembly and the optical fiber 4, a diffractive lens 5 also called a DOE (Diffractive Optical Element). The lens 5 operates by diffraction. This is an optical grating in two or three dimensions formed from microfacets that diffract the light. The size and the profile of the facets allow the desired optical function to be performed with high diffraction efficiency. Technically, DOEs are produced by the conventional micromachine techniques used in microelectronics. It is thus possible to produce several different optical functions on one and the same substrate. The diffractive lens of the transceiver has at least two geometrically separate regions, the first region 51 located on the periphery of the lens allowing the emit beam output by the emission source to be focused onto the entry face 43 of the optical fiber, the second region 52 located in the central region of the lens 5 allowing the receive beam coming from the optical fiber to be focused onto the photoreceiver 33. In FIG. 5, the emit and receive beams are shown as areas shaded grey, the arrows indicating the light propagation direction. The face 41 represents the core of the optical fiber and the face 42 the cladding of the optical fiber. The emit beam is coupled into the optical fiber within a solid angle $\alpha$ and the receive beam is emitted by the optical fiber within a solid angle $\beta$. The solid angle $\alpha$ is chosen in such a way that the light beam 27 obtained by glass reflection of the emit beam on the entry face of the optical fiber is reflected away from the detection surface of the photodetector. The solid angles $\alpha$ and $\beta$ are geometrically separate. Thus, the emit and receive beams are separated along their optical path and are transmitted without substantial optical loss and with low optical crosstalk (coupling between the optical emitter and the photodetector). The etched lens has a diameter of a few hundred microns and a thickness of a few microns. Its diffraction efficiency may be up to 95%.

The DOEs produced by means of microelectronic fabrication technologies make it possible to achieve an extremely high level of integration for a low cost. In addition, because they are planar, they are compatible with microelectronic assembly technologies. This device is therefore simple to implement, compact and of low cost.

It is possible to supplement this device as indicated in FIG. 5 by creating a third region 53 allowing that part 27 of the emit beam reflected by glass reflection on the entry face 43 of the fiber 4 to be focused onto a second photoreceiver 26. The electrical signal output by this second photoreceiver can then be used for monitoring the power emitted by the source, also called monitoring or wraparound function. This function also allows the aging of the emitting diode to be monitored and may be used for preventive maintenance in order to determine the state of the component or to help in locating a defective optical interface.

Figure 6:
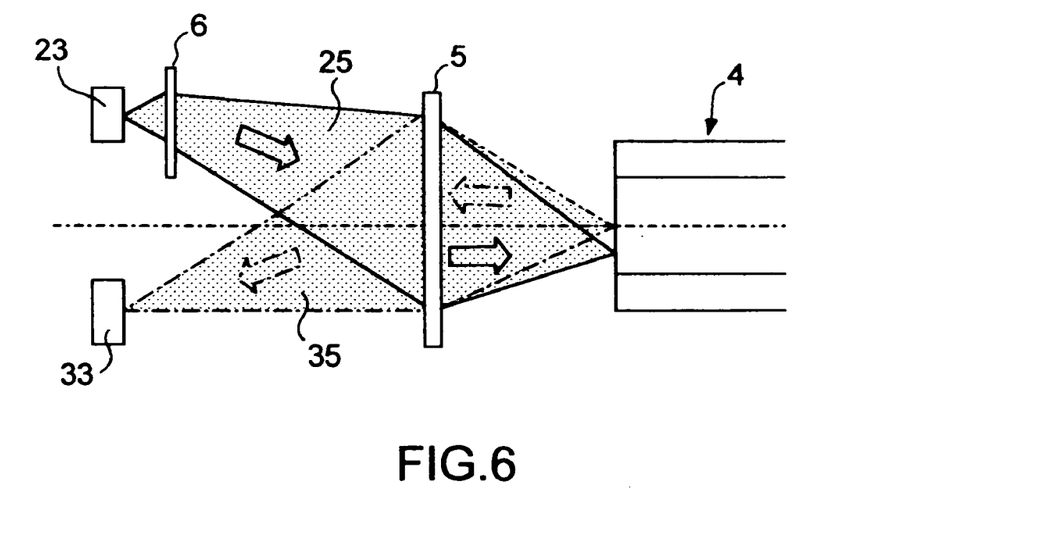
FIG. 6 shows the optical part of a transceiver according to the invention in a second embodiment.

FIG. 6 shows the optical part of a transceiver according to the invention in a second embodiment. This optical part comprises essentially an emission source 23, a photodetector 33, a first diffractive lens 5, placed between the emitter/photodetector assembly and the optical fiber 4, and a second diffractive lens, placed in front of the emission source 23. The emit and receive beams are shown by the areas shaded grey, the arrows indicating the light propagation direction. The lenses 5 and 6 have the same technology as the previous diffractive lens and their combined use makes it possible for the two-way optical coupler function to be produced. The lens 5 firstly focuses the light beam 35 coming from the optical fiber 4 onto the photodetector 33. It also focuses the beam 25 coming from the emitter 23 onto the optical fiber 4. The two beams 25 and 35 have different angles of incidence in the space lying between the lens 5, the emitter and the photoreceiver, and similar angles of incidence in the space lying between the lens 5 and the optical fiber 4. Despite the sensitivity of DOEs to the angle of incidence of the beam, this function is made possible thanks to the phase reconstruction properties of DOEs and to the possibility of multiplexing several optical functions within the same element. The emit light beam can therefore be coupled into the optical fiber along the same direction as the receive beam. The function of the lens 6 is to control the phase distribution of the light beam coming from the optical source so that said beam is seen by the lens 5 as a light beam coming from the photodetector 33.

Letting F1 be the optical transfer function of the lens 5 and F2 the transfer function of the lens 6, then the resultant transfer function at emission, namely $F_e$, is given by $F_e = F1 \times F2$.

Letting F2* be the conjugate optical transfer function of the lens 6 corresponding to the propagation direction of the photons from the fiber toward the photodetector, then it is possible to find F1 such that the resultant $F_e$ provides the desired function, equal to F2*. F1 is then equal to F2*/F2.

The lenses 5 and 6 are placed so that the emitter 23 and the receiver 33 lie in the same plane, thereby facilitating the implantation of these components.

Figure 7:
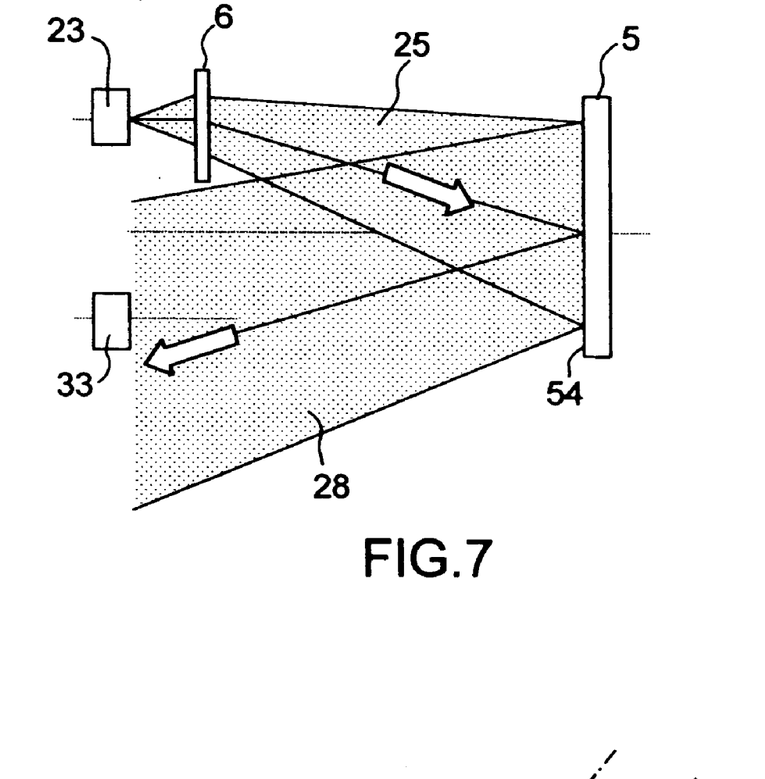
FIG. 7 shows the parasitic light beams in this second embodiment.

Part of the light emitted is reflected by at least the entry face 54 of the lens 5, as indicated in FIG. 7. Part of this parasitic light beam 28 illuminates the photodetector. The power $P_R$ received by the detector owing to the reflections on the entry face of the fiber is defined by the following approximate equation:

$P_R = R_{Fresnel} + 10 \log(\phi_{PD}/\phi_{Poptin}) + 10 \log(NA_{PD}/NA_{Poptin})$, where $R_{Fresnel}$ represents the total power reflected by the interface common to the emitter and to the receiver, $\phi_{PD}$ represents the useful diameter of the photoreceiver, $\phi_{Poptin}$ represents the diameter of the region illuminated by the parasitic light beam 28 in the plane of the photodetector and, finally, $NA_{PD}$ an $NA_{Poptin}$ represent the respective numerical apertures of the photodetector and of the image of the emitter by the lens 6, the last two terms of the equation being negative. In general, the degree of parasitic coupling that is derived from this equation, which is also called the return loss, is low in this configuration. It is possible to eliminate or substantially attenuate the degree of coupling due to the second face of the lens 5 by interposing, between this lens and the optical fiber 4, an index liquid that will eliminate the parasitic reflections by matching the optical index between the lens and the optical fiber.

Figure 8:
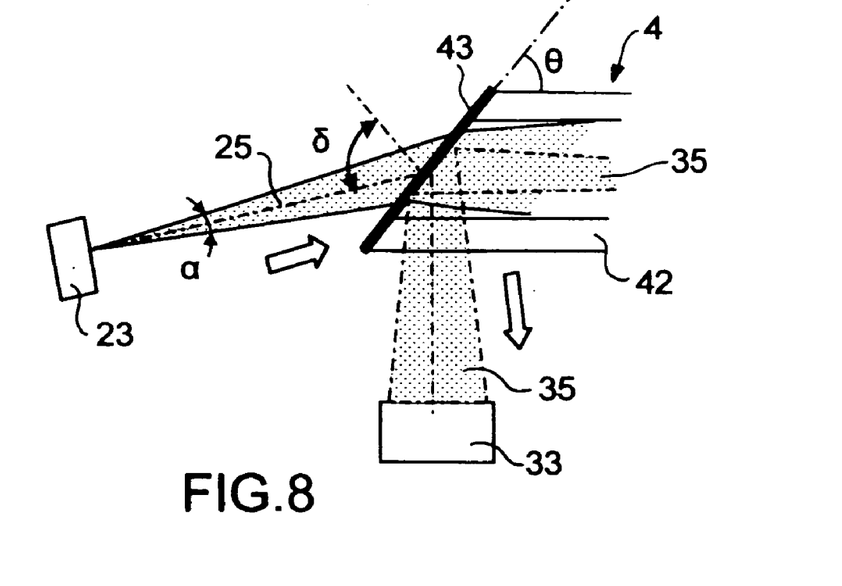
FIG. 8 shows the optical part of a transceiver according to the invention in a third embodiment.

FIG. 8 shows the optical part of a transceiver according to the invention in a third embodiment. This optical part comprises essentially an emission source 23 and a photodetector 33. The emit and receive beams are shown as the areas shaded grey, the arrows indicating the light propagation direction. In this configuration, the entry face 43 of the optical fiber is inclined at an angle θ close to 45° to the optical axis of the optical fiber, the emission source lying on an axis inclined at an angle 6 to the normal to the optical fiber so that the emit beam 25 is transmitted into the optical fiber 4 with optimum coupling. The photoreceiver lies on an axis obtained by reflection of the optical axis of the fiber on the entry face 43 so that the receive beams are transmitted to the photoreceiver by reflection on the entry face 43 and then by transmission through the cladding 42 of the optical fiber 4. This particularly simple configuration requires no additional optical components, the geometrical configuration ensuring both transmission and reception of the received signals. The transmission factors of the emit beam and the receive beam depend on their respective angles of incidence on the entry face of the fiber, on the indices of the fiber/optoelectronic component medium and on the core of the fiber. It is possible to optimize the efficiencies by varying the angles θ and δ.

Figure 10A:
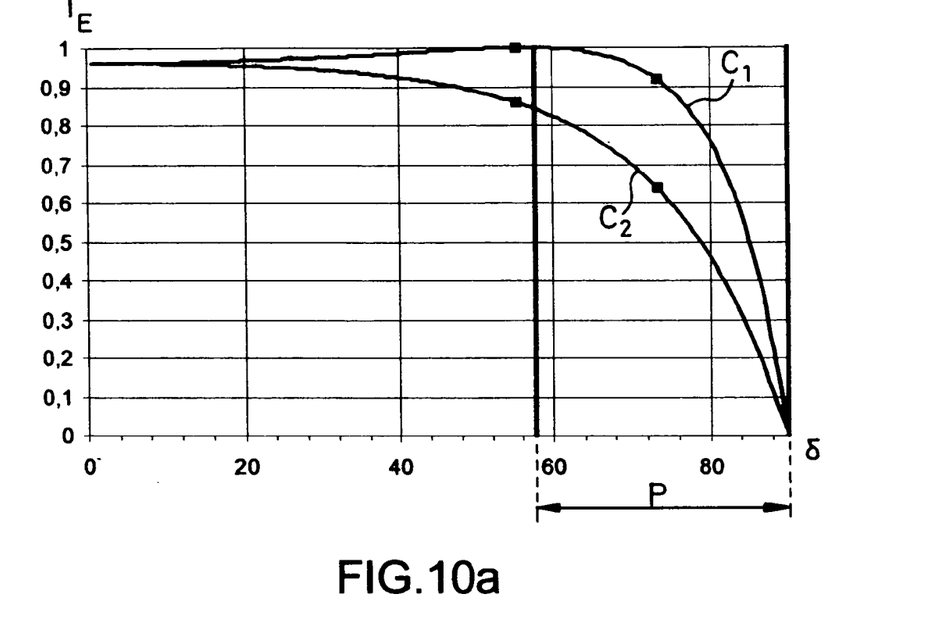
FIG. 10 gives the transmission coefficients for the transmission in the optical fiber in the emit and receive beams in the case of the devices shown in FIGS. 8 and 9.

Curves $C_1$ and $C_2$ in FIG. 10a show the coupling coefficients $T_E$ between the light beam coming from the emitter and the optical fiber 4 in the case of parallel and perpendicular linear polarizations as a function of the angle of incidence δ. The range P represents the range of acceptance by the optical fiber for propagating the light beams in the optical fiber for an angle θ of 45°.

Figure 10B:
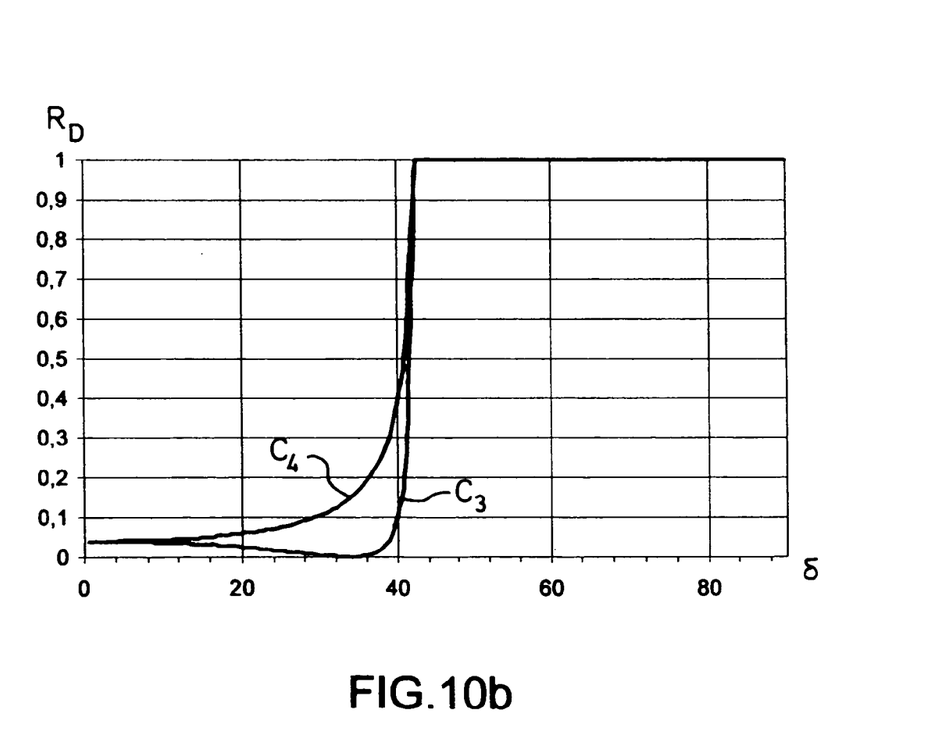

Curves $C_3$ and $C_4$ in FIG. 10b show the reflection coefficients $R_D$ of the light beam coming from the optical fiber onto the entry face 43 for parallel and perpendicular linear polarizations as a function of the angle of incidence δ on this face. The beam is totally reflected at angles above the total reflection angle, which is slightly above 40°.

It is also possible to place an antireflection coating on the entry face 43 so as to further reduce the losses by glass reflection of the emit beam on said entry face. The angles are controlled for example by polishing the optical fiber.

Figure 9:
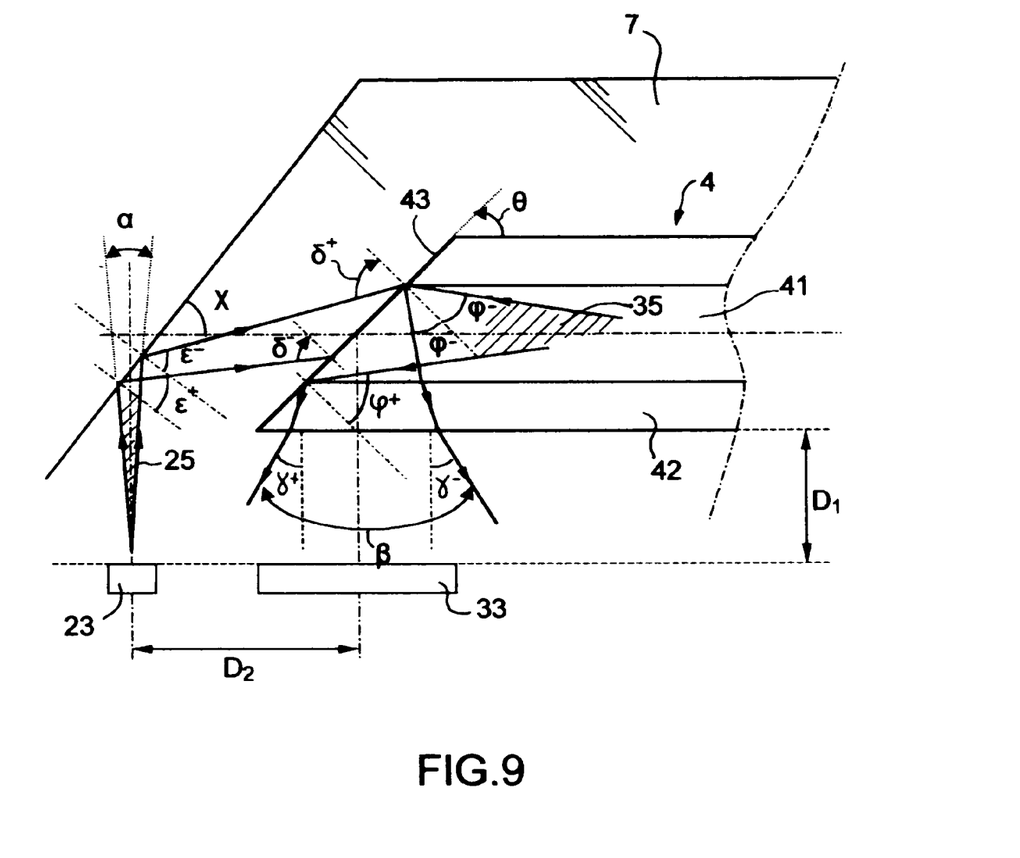
FIG. 9 shows a variant of the device shown in FIG. 8.
Figure 11:
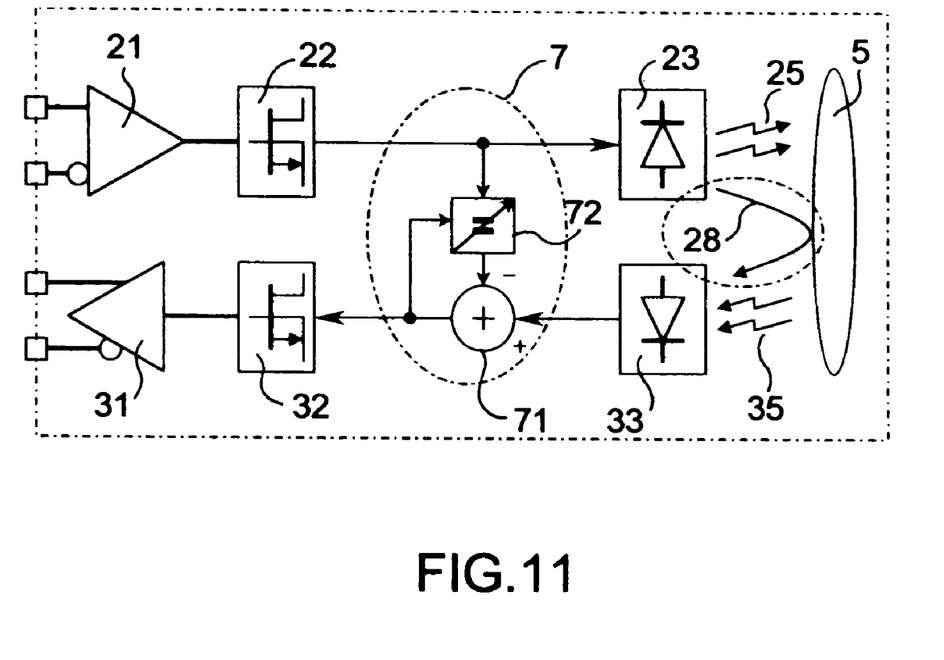
FIG. 11 shows the electronic diagram of a feedback device for attenuating the effects of the parasitic light.

In a variant of the above embodiment illustrated in FIG. 9, the optical part includes a substrate 7 with an optical index N in the form of an angled surface placed between the entry face of the optical fiber and the emission source. The angle of inclination χ of the angled surface to the optical axis of the optical fiber is such that the angle of incidence of the emit beams on the angled surface varies between $\epsilon^-$ and $\epsilon^+$. This angle of incidence is high enough for there to be total reflection on the medium of optical index N after reflection on this angled surface. The emit beam is transmitted into the optical fiber at an angle δ varying between $\delta^+$ and $\delta^-$, ensuring that there is good coupling. The angle of incidence of the receive beams on the entry face of the optical fiber varies between $\phi^+$ and $\phi^-$. This angle of incidence is high enough for there to be total reflection on the entry face 43. The beams reflected by said face are transmitted by the cladding 42 of the optical fiber at an angle of incidence varying between $\gamma^+$ and $\gamma^-$, defining the receive angle β on the photoreceiver 33. The emission source and the photodetector lie in the same plane, located at a distance $D_1$ from the optical fiber 4. The emitter 23 and the photoreceiver 33 are separated by a distance $D_2$ sufficient to allow them to be integrated. This arrangement favors the integration of the optoelectronic transmission and reception components. The angles are controlled, for example, by polishing the optical fiber and by wet etching of the silicon substrate for mutual alignment of the various components, as shown in FIG. 11.

In this architecture, any direct optical coupling between emitter and receiver is virtually no existent. It is further reduced by carrying out an antireflection treatment, as indicated in the previous paragraph.

The configurations described generally have a low return loss. This return loss can be easily estimated using equations giving the various geometrical and photometric parameters of the device. However, the receive light beams are, by nature, of much lower amplitude than the emit beams. Consequently, the return loss may in certain configurations prove to be problematic. It is then possible to install an electronic feedback device 7 placed between the emit and receive electronic devices, the electronic function of said device being to subtract, from the electrical signal output by the photoreceiver 33, an electrical signal equal to the parasitic signal due to the parasitic reflections 28 of the emit beam 25 illuminating said photoreceiver 33. FIG. 11 illustrates this principle. Said feedback device comprises at least one electronic equalizer 71 and an adaptive filter 72, the coefficients of which are adjusted in a preliminary calibration phase. In the absence of received signal, the photoreceiver receives only a light signal due to the parasitic return loss. This parasitic signal is identical to the emitted signal, apart from the amplitude. Knowing this amplitude, it is then possible at the output of the photodetector to eliminate this parasitic signal by subtracting therefrom a signal having the same amplitude and identical waveform as the emitted signal. The effects due to return loss are thus largely eliminated.

For the various configurations according to the invention, the emitting source may be a laser diode, a light-emitting diode or a VCSEL (Vertical-Cavity Surface-Emitting Laser). The emission wavelengths typically lie in the near infrared range, for example at 850 nanometers.

The photodetector may for example be a PIN photodiode in GaAs (gallium arsenide) or MSM (metal-schottky-metal) technology.

The important geometrical characteristics of a multimode or monomode optical fiber are the diameter of the optical core of the fiber given in microns and the diameter of the cladding of the fiber, again in microns. For this type of application, the multimode optical fiber standards generally used are 62.5/125 or 50/125, the first number representing the core diameter and the second representing the cladding diameter of the fiber. Preferably, the optical fibers are made of silica with a graded-index core.

To connect the optical fiber to the transceiver, two types of solution are possible. Either the device includes a first optical connector in which the optical fiber 4 is fixed by means of a second connector, or the device includes an optical socket in which the optical fiber 4 is fastened via one of its ends, the free end having an optical coupling connector, the device being what is called "pigtailed". All types of standard connector may be suitable for the transceiver according to the invention.

An electronic card may include at least one device according to the invention. An electronic computer may include at least said electronic card. A full-duplex fiber-optic communication system allowing simultaneous transmission and reception of signals on a single optical fiber may include at least two electronic computers of this type.

An optoelectronic device of the repeater or switch type may include an optical communication device according to the invention. A full-duplex fiber-optic communication system for simultaneous transmission and reception of signals on a single optical fiber may include at least said optoelectronic device.

The invention claimed is:

1. An optical communication device for optical fibers, of the transceiver type comprising:
   electronic emission and receiver means,
   a light emission source,
   a photoreceiver; and
   optical means for sending an emit light beam output by the emission source onto the entry face of a single optical fiber and, to couple a receive light beam, coming from said optical fiber onto the photoreceiver, wherein the entry face of the optical fiber is inclined at an angle θ close to 45° to the optical axis of the optical fiber, the emission source lying on an axis inclined at an angle δ to said optical axis so that the emit beam is transmitted into the optical fiber and, since the photoreceiver lies on an axis obtained by reflection of the optical axis of the fiber on the entry face, so that the receive beams are transmitted to the photoreceiver by reflection on the entry face, the emit beam being incident on said entry face of the fiber being bounded by a solid angle α and the receive beam being incident on said entry face being bounded by a solid angle β, the solid angle α being essentially separate from the solid angle β, allowing geometrical separation of the emit and receive beams.

2. An optical communication device for optical fibers, of the transceiver type comprising:
   electronic emission and receiver means;
   a light emission source;
   a photoreceiver and optical means for sending an emit light beam output by the emission source onto the entry face of a single optical fiber and, to couple a receive light beam, coming from said optical fiber onto the photoreceiver, wherein the optical means include a diffractive lens having two geometrically separate regions, the first region allowing the emit beam to be focused onto the entry face of the optical fiber and the second region allowing the receive beam coming from the optical fiber to be focused onto the photoreceiver, the emit beam being incident on said entry face of the fiber bounded by a solid angle α and the receive beam being incident on said entry face being bounded by a solid angle β, the solid angle a being essentially separate from the solid angle β, allowing geometrical separation of the emit and receive beams.

3. The optical communication device as claimed in claim 1, comprising a second photoreceiver and in that the diffractive lens comprises a third region allowing that part of the emit beam reflected by glass reflection on the entry face of the fiber to be focused onto said second photoreceiver.

4. The optical communication device as claimed in claim 1, wherein the entry face includes an antireflection coating allowing the losses caused by glass reflection of the emit beam on the entry face to be reduced.

5. The optical communication device as claimed in claim 1, comprising a substrate with an angled surface placed between the entry face of the optical fiber and the emission source so that the emit beam, after reflection on this angled surface, is transmitted into the optical fiber and in that the emission source and the photoreceiver lie in the same plane.

6. The optical communication device as claimed in claim 1, wherein the emission and receive light beams have approximately the same wavelength.

7. The optical communication device as claimed in claim 1, comprising an electronic feedback device placed between the emit and receive electronic devices, the electronic function of said device being to subtract, from the electrical signal output by the photoreceiver, an electrical signal equal to the parasitic signal due to the parasitic reflections of the emit beam illuminating said photoreceiver.

8. The optical communication device as claimed in claim 7, wherein that said feedback device includes at least one electronic equalizer and an adaptive filter.

9. The optical communication device as claimed in claim 1, comprising a first optical connector in which the optical fiber is fixed by means of a second connector.

10. The optical communication device as claimed in claim 1, comprising an optical socket in which the optical fiber is fastened via one of its ends, the free end having an optical coupling connector, and the device being called pigtailed.

11. An electronic card comprising at least one device as claimed in claim 1.

12. An electronic computer comprising at least one electronic card as claimed in claim 11.

13. An optoelectronic device of the repeater or switch type, comprising an optical communication device as claimed in claim 1.

14. A full-duplex fiber-optic communication system allowing simultaneous transmission and reception of signals on a single optical fiber, comprising at least two electronic computers as claimed in claim 12.

15. A full-duplex fiber-optic communication system allowing simultaneous transmission and reception of signals on a single optical fiber, comprising at least one optoelectronic device as claimed in claim 13.

16. An optical communication device for optical fibers, of the transceiver type comprising:

electronic emission and receiver means, a light emission source, a photoreceiver and optical means for sending an emit light beam output by the emission source onto the entry face of a single optical fiber and to couple receive light beam, coming from said optical fiber onto the photoreceiver, wherein the optical means consist essentially of two diffractive lenses, the emit beam being coupled onto the entry face of the optical fiber by diffraction by the two lenses, the receive beam being coupled onto the photoreceiver by diffraction by only one lens, the emit beam being incident on said entry face of the fiber being bounded by an emission area and the receive beam incident on said entry face being bounded by a receiver area, the emission area being of substantially smaller size than the receiver area, allowing geometrical separation of the emit and receive beams.

* * * * *